US007440514B2

(12) United States Patent
Romunen

(10) Patent No.: US 7,440,514 B2
(45) Date of Patent: Oct. 21, 2008

(54) CONTROL OF DATA TRANSMISSION VOLTAGE LEVEL USING CLIPPING IN A LOW-VOLTAGE NETWORK

(76) Inventor: Jorma Romunen, Kauriinpelto T 170, FI__33880, Lempäälä (FI)

( * ) Notice: Subject to any disclaimer, the term of this patent is extended or adjusted under 35 U.S.C. 154(b) by 505 days.

(21) Appl. No.: 10/497,969

(22) PCT Filed: Dec. 9, 2002

(86) PCT No.: PCT/FI02/01000

§ 371 (c)(1),
(2), (4) Date: Jun. 9, 2004

(87) PCT Pub. No.: WO03/056715

PCT Pub. Date: Jul. 10, 2003

(65) Prior Publication Data

US 2005/0117659 A1 Jun. 2, 2005

(30) Foreign Application Priority Data

Dec. 10, 2001 (FI) .................................. 20012421

(51) Int. Cl.
*H04L 25/49* (2006.01)
(52) U.S. Cl. ...................................................... 375/297
(58) Field of Classification Search ................ 375/285, 375/295–297; 327/306, 309, 312, 317, 59–62, 327/52, 54, 56, 58; 455/63.1, 114.2, 114.3
See application file for complete search history.

(56) References Cited

U.S. PATENT DOCUMENTS

| 4,152,656 | A | * | 5/1979 | Udvardi-Lakos | ................ 327/7 |
| 4,165,493 | A | * | 8/1979 | Harrington | ................ 330/207 P |
| 4,451,801 | A | | 5/1984 | Monticelli | |
| 4,547,746 | A | * | 10/1985 | Erickson et al. | ............. 330/298 |
| 4,815,106 | A | * | 3/1989 | Propp et al. | ................. 375/257 |
| 4,837,832 | A | * | 6/1989 | Fanshel | ...................... 381/317 |

(Continued)

FOREIGN PATENT DOCUMENTS

EP          0267887          5/1988

(Continued)

OTHER PUBLICATIONS

Khorramabadi et al; "A Highly-Efficient CMOS Line Driver with 80 dB Linearity for ISDN U-Interface Applicationw", 1992 IEEE Int'l Solid-State Circuits Conference, Feb. 19-21, 1992, pp. 192-193.

*Primary Examiner*—Tesfaldet Bocure
(74) *Attorney, Agent, or Firm*—Stites & Harbison PLLC

(57) ABSTRACT

A method is provided for controlling a load signal of a signal transmitter in a data system for sending data in a low voltage network in order to keep an input signal voltage constant. The load signal is supplied through a coupling unit that provides signal coupling the network. The data transmission system also includes a signal amplifier, a signal filter and a source of signal amplifier operating voltage. The signal amplifier includes a signal clipper or a function for clipping the output signal of the signal amplifier and/or for clipping the input signal amplifier. The clipping is dependent on the output voltage of the signal to be sent to the network or on the output current from signal amplifier.

12 Claims, 3 Drawing Sheets

U.S. PATENT DOCUMENTS

| | | | |
|---|---|---|---|
| 4,963,979 A * | 10/1990 | Sendelweck | 348/554 |
| 5,507,033 A * | 4/1996 | Dolan | 455/422.1 |
| 5,798,674 A * | 8/1998 | Fountain | 332/149 |
| 7,064,613 B2 * | 6/2006 | Kolsrud et al. | 330/296 |
| 7,139,327 B2 * | 11/2006 | Vella-Coleiro et al. | 375/296 |
| 2001/0054934 A1 * | 12/2001 | Antognetti et al. | 330/296 |
| 2003/0223508 A1 * | 12/2003 | Ding et al. | 375/296 |
| 2005/0123066 A1 * | 6/2005 | Sarca | 375/296 |

FOREIGN PATENT DOCUMENTS

| | | |
|---|---|---|
| EP | 1089453 | 4/2001 |
| EP | 1089453 A1 * | 4/2001 |
| WO | WO03/056715 A1 * | 6/2003 |
| WO | WO 2004/088870 A1 * | 10/2004 |

* cited by examiner

CONTROL OF DATA TRANSMISSION VOLTAGE LEVEL USING CLIPPING IN A LOW-VOLTAGE NETWORK

BACKGROUND OF THE INVENTION

The invention is suited for control of the voltage level of load signals $U_L$ from transmitters in a data transmitting system sending data in low-voltage network. The aim is to keep the load signal as to its voltage level as constant as possible in the transmitter mains connection that is independent of net impedance, which impedance can sometimes be quite low and thus tending to attenuate the load signal to a degree unfit for use with respect to reliable communication. Usually, by low-voltage a net of 230 V 50 Hz or some other low-voltage net is referred to.

CROSS-REFERENCE TO RELATED APPLICATIONS

In quite traditional systems the voltage amplitude of the load signal drops strongly, when the impedance is attenuating. The maximum output level (EUROPE) can drop from 122 dBu V even to 16 dBu V (⅙ voltage level) the net impedance then being 1 ohm. Mostly even this kind of systems can work reliably most of the time, but the fact that they are not always working correctly, make them, commercially thinking, unusable. FIG. 1 shows a prior art solution.

In my opinion the most advanced modern techniques is in this respect represented by PCT application WO 01/15334 A1 (Aug. 17, 2000). In it the load signal is kept almost constant in the transmitter mains connection by means of feedback coupling independent of net impedance and frequency. The method is based on the fact that the current feed capacity of the signal amplifier to a network of 230 V 50 Hz working as load is increased the more the lower the network impedance $Z_L$ is. The above presented is a system, where in my opinion the signal (sinus shaped) is by no means cut from its peaks, but the signal amplifier pushes the more sinus shaped power to load $Z_L$ the lower the $Z_L$ is by each frequency. Thus load signal $U_L$ across $Z_L$ remains almost constant. However, no curve $U_L=U_L(Z_L)$ is presented so there is no knowledge of the load signal level, for instance by low $Z_L$ values and also no knowledge of the quality of the invention.

The disadvantage of the feedback coupling system is, however, possible susceptibility against many kinds of disturbances appearing in the network if no interference suppression has been carried out most effectively. Also in EMC ("electromagnetic compatibility") tests the transmitters do not pass easily without good EMC characteristics. Effective suppression against interference increases the manufacturing costs of transmitters a little. In this case situation is weakened because feedback signals $U_M$ and $1_M \times R_{CS}=U_{mass}$ are taken directly from points easily reached by disturbances from a network without suppression. If interference is carried out correctly and properly working, the method disclosed in the respective PCT publication is good.

BRIEF SUMMARY OF THE INVENTION

In the present invention the amplitude of the signal is controlled by clipping and/or distorting of the signal, rather than by gain control of the signal amplifier without clipping or distorting of the signal. ACC=Automatic Cutting Control. The aim of this invention is to keep also load signal $U_L$ constant in net impedance $Z_L$, in other words independent net impedance $Z_L$, but in quite another way, that is by cutting the output voltage of the signal amplifier from its peak, or in another way by cutting or distorting when $Z_L$ is high and load voltage $U_L$ would without cutting tend to be too high. Alternatively cutting can be carried out by reducing the supply voltage of the signal amplifier so that cutting takes place already in the signal amplifier. After cutting, the low pass filter and bandpass filter filter off harmonic waves generated on cutting under maximum level as required by standard. The method as per this invention is characterized in what is presented in the claims.

If the net impedance is low enough no signal cutting takes place but the maximum signal of signal amplifier is fed forward and further as such to the network. Thus a load voltage $U_L$, remaining constant, is achieved also with low net impedance values.

The input voltage $U_{IN}$ of the signal amplifier is of constant amplitude as also the output voltage $U_{OUT}$ of the signal amplifier (signal amplifier supply voltage $U_S$ is constant, in other words ungovernable). This holds true for the above presented text.

Described above is that cutting of output signal can take place in signal amplifier or after it by cutting it from its peak. Another alternative is that the output signal is cut in the signal amplifier or in subsequent blocks or in some other way. One possibility is 'zero point cutting', with other words the signal is cut from the centre so that positive and negative half periods can pass through as far their peaks are concerned, but from the root always a part of the half period is omitted. There are also other possible ways of cutting. If it is the question of a sinusoidal signal, the signal gets distorted on cutting and generated harmonic waves must be filtered off before getting fed into the network. Also such a method can be used that the input signal $U_{IN}$ of signal amplifier is cut from line impedance $Z_L$ by a dependent way. E.g. $U_L$ is applied to Control Unit 60 and $U_{ACC}$ or $I_{ACC}$ is fed to Signal Amplifier 20 to clip and/or distort $U_{IN}$.

The control of load signal $U_L$ is in this invention always based on cutting the signal in one way or another. So it is not the question that the signal amplitude is controlled, while the signal is however retaining its original shape. It is quite another way of signal control (ALC and AGC), with other words automatic level control and automatic gain control.

ALC=Automatic Level Control

AGC=Automatic Gain Control

In this invention keeping the voltage level of load signal $U_L$ constant by the cutting principle takes place so that the transmitter sends a signal in principle at maximum level to the network, but the signal tending to grow by high $Z_L$ values is restricted in early blocks by cutting or distorting.

The cutting system has no impact on power consumption, since source voltage ($U_S$) must be dimensioned according to the situation of maximum load. Maximum power consumption appears when net impedance $Z_L$ is at its lowest and just then the signal is not cut. By high $Z_L$ the power consumption is small and the small increase of consumption due to cutting does not have any effect. Even in that respect an advantageous solution.

With respect to interference suppression the invention is advantageous, because usually there is no EMC susceptible feedback (especially when the cutting method is not used controlling the source voltage at the voltage source). On transmission-disturbances across the network have no effect neither on transmitter operation in practise nor EMC-susceptibility tests. Further, it is of great help that disturbances from the network are attenuated and meet at first the low-pass filter or band-pass filter and another interference suppression. As to its costs the cutting system is really profitable. As additional components for instance a capacitor C (e.g. 1 uF, ceramic or plastic capacitor) and two Zener diodes or, alternatively, a VDR resistor or another corresponding component. Generally, the cost price should be kept as low as possible in order to enable serial production and to be able to compete. The invention can be put into practice at low price and works also in bad interference conditions.

The cutting method according to the invention, as in the PCT-publication presented adjusting method of the load signal level, is good enough for many applications in practise in the network as considered in relation to reliable data transmission.

BRIEF DESCRIPTION OF THE SEVERAL VIEWS OF THE DRAWINGS

In the following the invention is disclosed with reference to the enclosed table and drawing figures, where Table 1 shows load signal $U_L$ as function of net impedance $Z_L$ without signal cutting and with signal cutting.

DETAILED DESCRIPTION OF PREFERRED EMBODIMENTS OF THE INVENTION

Figure 1:
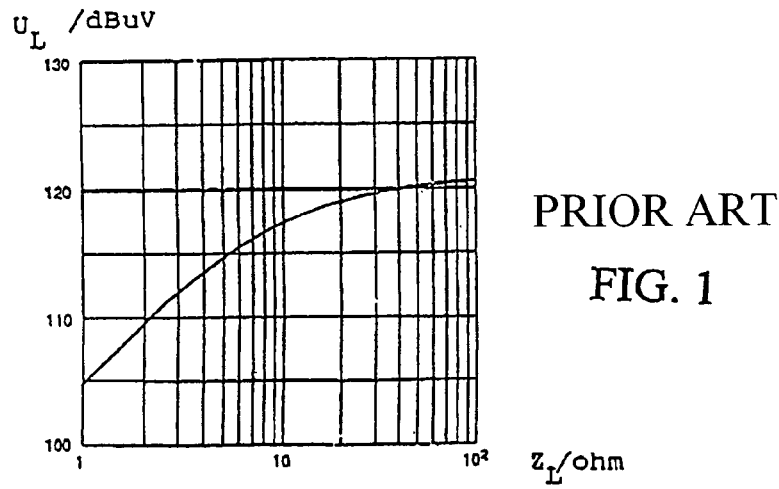
FIG. 1 shows a prior art voltage curve.

The dots of block diagram marked with small circles are numbered measuring points 5, 11, 15, 21, 31, 41, 51, 61. In association with them an arrow is marked to illustrate voltage and or current symbol.

Block 10 is an adjustable or fixed voltage source, the source voltage $U_S$ of which is adjustable in measuring point 61 by means of voltage $U_{ADJ}$ available from control block 60.

The actual signal to be transmitted (e.g. under 95 kHz, 95-125 kHz, 125-140 kHz or 140-148.5 kHz) can be a sinusoidal or a square signal; input voltage $U_{IN}$ in measuring point 15.

Signal Amplifier 20 is a signal amplifier where the above mentioned input signal is amplified and its great output signal $U_{OUT}$ in measuring point 21 is fed into signal clipper 30. Signal $U_{CLP}$ clipped in this way in measuring point 31 is fed further to the low-pass or band-pass signal filter 40, the output voltage of which $U_{FL}$ is a very clean sinusoidal wave free of harmonic wave components. Signal $U_{FL}$ in measuring point 41 is fed across coupling unit 50 and through transmitter output connector (L-N) to the network, and to 'ride' onto the active net voltage $U_N$ where it gets in $U_L$ size across net impedance $Z_L$ in measuring point 51 ($U_N + U_L$).

From Coupling Unit 50 output (measuring point 51) signal ($U_N + U_L$) is taken to control block 60, which gives directly a control voltage $U_{ADJ}$ or another kind of variable proportional to signal $U_L$ amplitude in measuring point 61 to control adjustable voltage source 10, the direct source voltage $U_S$ given by it functions as supply voltage of signal amplifier 20. The greater the $U_S$ the smaller the $U_L$ tends to be and so in signal amplifier 20 the more the $U_{OUT}$ gets clipped from its peak the smaller the $U_S$ is. In this the $U_{IN}$ is constant all the time as even the voltage amplification of signal amplifier 20. By so great net impedance values the load signal amplitude $U_L$ tending to grow is clipped almost to a constant value. By means of control voltage $U_{ADJ}$ from control block 60 or another control variable can instead of adjustable voltage source 10 block 20, 30 or 40 be controlled in order to clip or distort the signal.

If, on the other hand, the net impedance $Z_L$ is very low, then also $U_L$ is very low and $U_S$ again at its maximum and there is no clipping in signal amplifier 20 and a maximum load signal is achieved to the net impedance. Even by such low net impedances a signal as high as possible can be fed into the network. Control block 60 can get into the $U_L$ its proportional instead of measuring point 51 (presented above), for instance from measuring point 21, 31 or 41. Since adjustment of load signal $U_L$ into a constant value in adjusting the $U_S$ is not the most advantageous application, probably more advantageous methods presented in the following will be used in signal clipping in order to keep load signal $U_L$ constant.

Block 70 is a receiver and blocks 20-40 can also be controlled by direct voltage proportional to the transmission voltage receivable from receiver 70 or by some other control variable.

In the above description signal clipper 30 was not all in function. In the following control block 60 is removed, while voltage source 10 is continuously feeding constant maximum source voltage $U_{SMAX}$ as operating voltage of signal amplifier 20. The amplification of signal amplifier is constant, that is so high that output signal $U_{OUT}$ hardly gets clipped at all or just a little from its peaks. $U_S$=source voltage=supply voltage. $U_{SMAX}$=the available maximum magnitude of source voltage $U_S$ An alternative is to clip input signal $U_{IN}$ the more the greater the $Z_L$ and $U_L$ are. However, if input signal $Z_{IN}$ is kept constant, clipping is carried out in signal clipper 30 in the cheapest way. It takes place so that there is a series resistance in the input connection of signal clipper 30 and after it a capacitor (if needed) followed by two zener diodes, transzorbs, a VDR resistor or some other similar clipping component.

Figure 3:
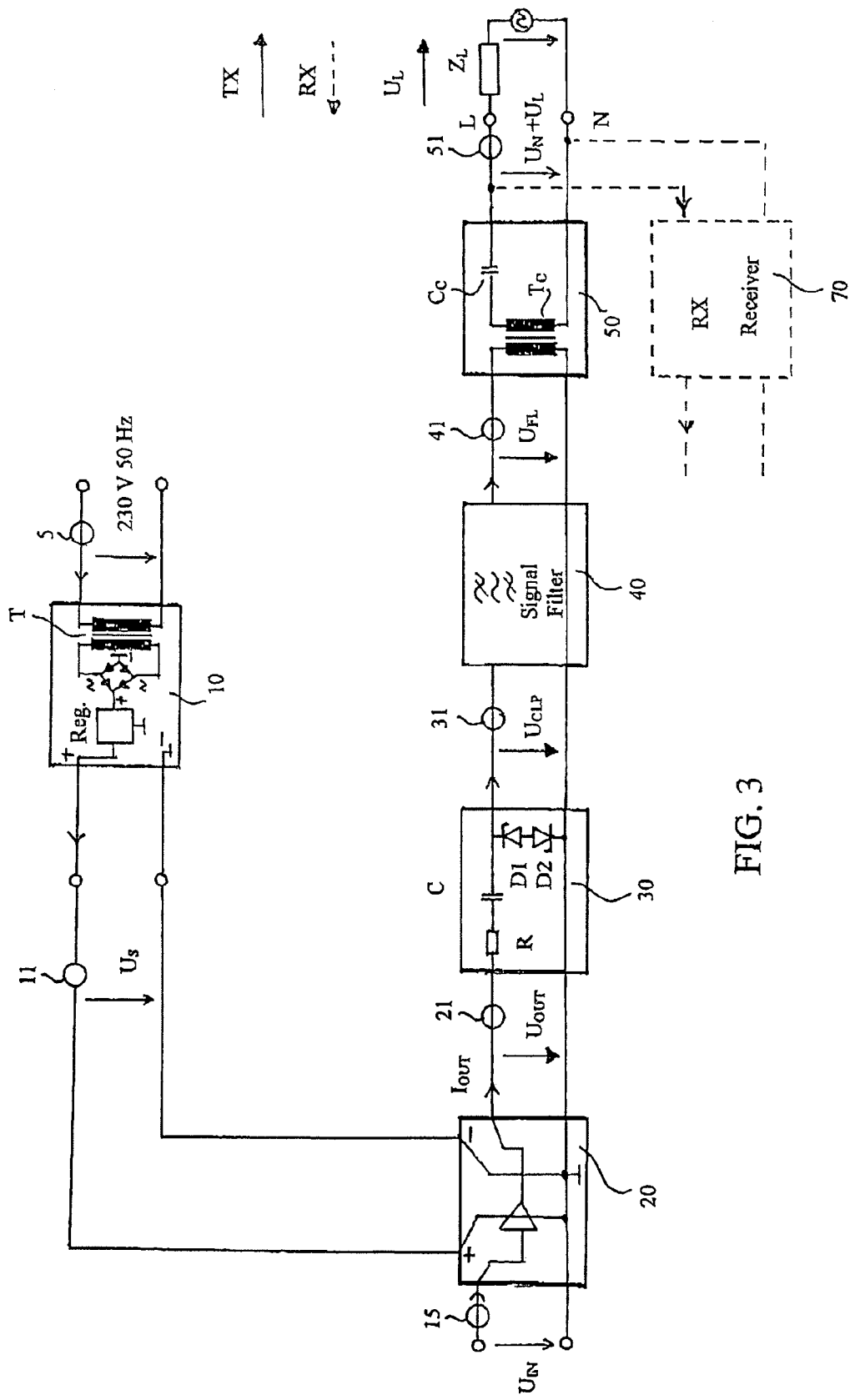
FIG. 3 is a block diagram of another exemplary embodiment of the invention.

If net impedance $Z_L$ is very low, then the output current $I_{OUT}$ of signal amplifier 20 is high. Thereby in serial resistance R of signal clipper 30 there is a great drop of voltage and, for instance, the zener diodes do not clip at all even a whole signal from its top, since the signal voltage across them is so low that the zener voltage is not exceeded. By high $Z_L$ values the a the signal will be clipped strongly again. (Ref. FIG. 3).

The signal can be clipped or distorted even in other ways and already in signal amplifier 20 and not until signal clipper 30. It can, for instance, take place as 'zero point clipping', whereby the peaks can pass without getting clipped but both signal half periods clipped from their root. It can be carried out by automatic adjustment of base-to-emitter voltages $U_{BE}$ of signal amplifier 20 power transistors in a way dependent on the $U_L$ amplitude. $U_{BE}$=base-to-emitter DC-voltage. For instance, control unit 60 produces control signal $U_{ACC}$ or $I_{ACC}$ proportional to load signal voltage $U_L$ to control the strength of clipping and/or distorting of signal in the Signal Amplifier 20 and/or the Signal Clipper 30. The higher $Z_L$ and $U_L$, the stronger the clipping and/or distorting function.

However, common to all adjustment ways is that adjustment takes place clipping the signal in one way or another and that the signals gets strongly distorted. The principle of distortion holds true if the signal amplifier 20 input signal $U_{IN}$ and output signal $U_{OUT}$ are sinusoidal signals. If the signals are square signals, no distortion takes necessarily place even on clipping, since if a square wave is clipped from its peak, in the peak or in the centre, still the signal square shape remains square.

In the following an example is presented of a practical application with reference to FIG. 3 illustrating a practical application.

The supply voltage $U_S$ of signal amplifier 20 is a regulated direct voltage, e.g. +15 V. Input signal $U_{IN}$ (e.g. 95-125 kHz) can be a sinusoidal or a square wave 5 Vpp. The voltage gain of signal amplifier 20 is constant and of such kind that input signal $U_{IN}$ does not get quite clipped or gets clipped slightly at signal amplifier output ($U_{OUT}$ in measuring point 21). $U_{OUT}$ is as to its amplitude about 15 Vpp either a sinusoidal or a square type signal. There is in signal clipper 30 a serial resistance R (many ohms), a serial capacitor (e.g. 1 uF) and two zener diodes D1 and D2, which do not at low net impedance $Z_L$ values clip signal $U_{CLP}$ at all or only slightly but at net impedance $Z_L$ high values (e.g. 50 ohm) they clip signal $U_{CLP}$ from its peaks to a level determined by the zener diodes. Clipping is based on the fact that the drop of voltage $I_{OUT} \times R$ in resistor R is the lower the higher the net impedance $Z_L$.

Signal $U_{CLP}$ the voltage level of which was made constant on clipping, is fed through low-pass or band-pass signal filter 40 and coupling unit 50 to the network between phase and neutral. $T_C$ is a coupling transformer an $C_C$ a coupling capacitor.

Galvanic separation from the network takes place by means of net transformer T and the coupling transformer of signal $T_C$. (The coupling transformer could, of course, be even left out and the signal coupled galvanically direct to the network through coupling capacitor $C_C$. However, for electrical safety galvanic separation is good).

Figure 4:
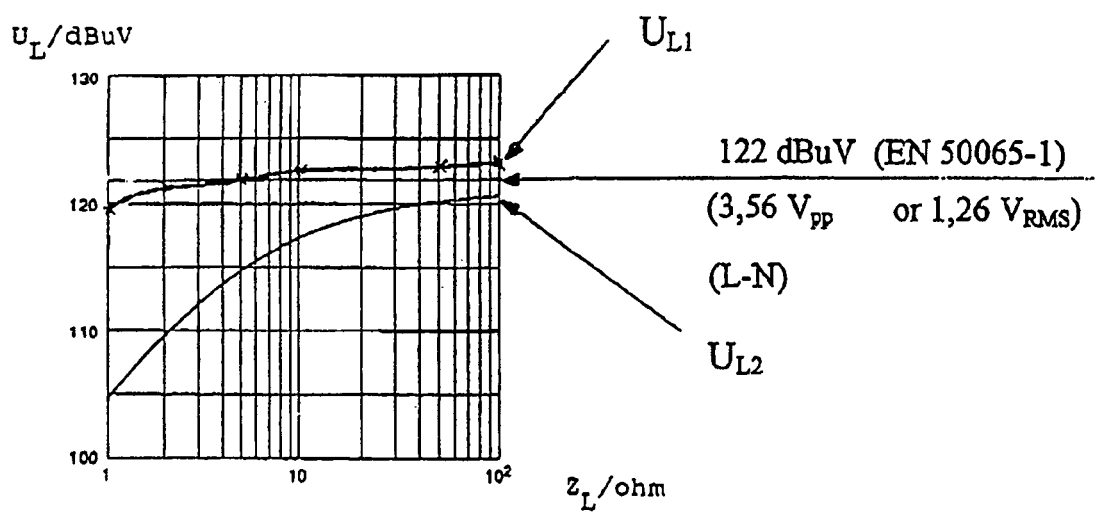
FIG. 4 is a graph showing a load signal voltage $U_L$ as a function of network impedance $Z_L$ achievable by means of the exemplary embodiment of the invention of FIG. 3.
Figure 2:
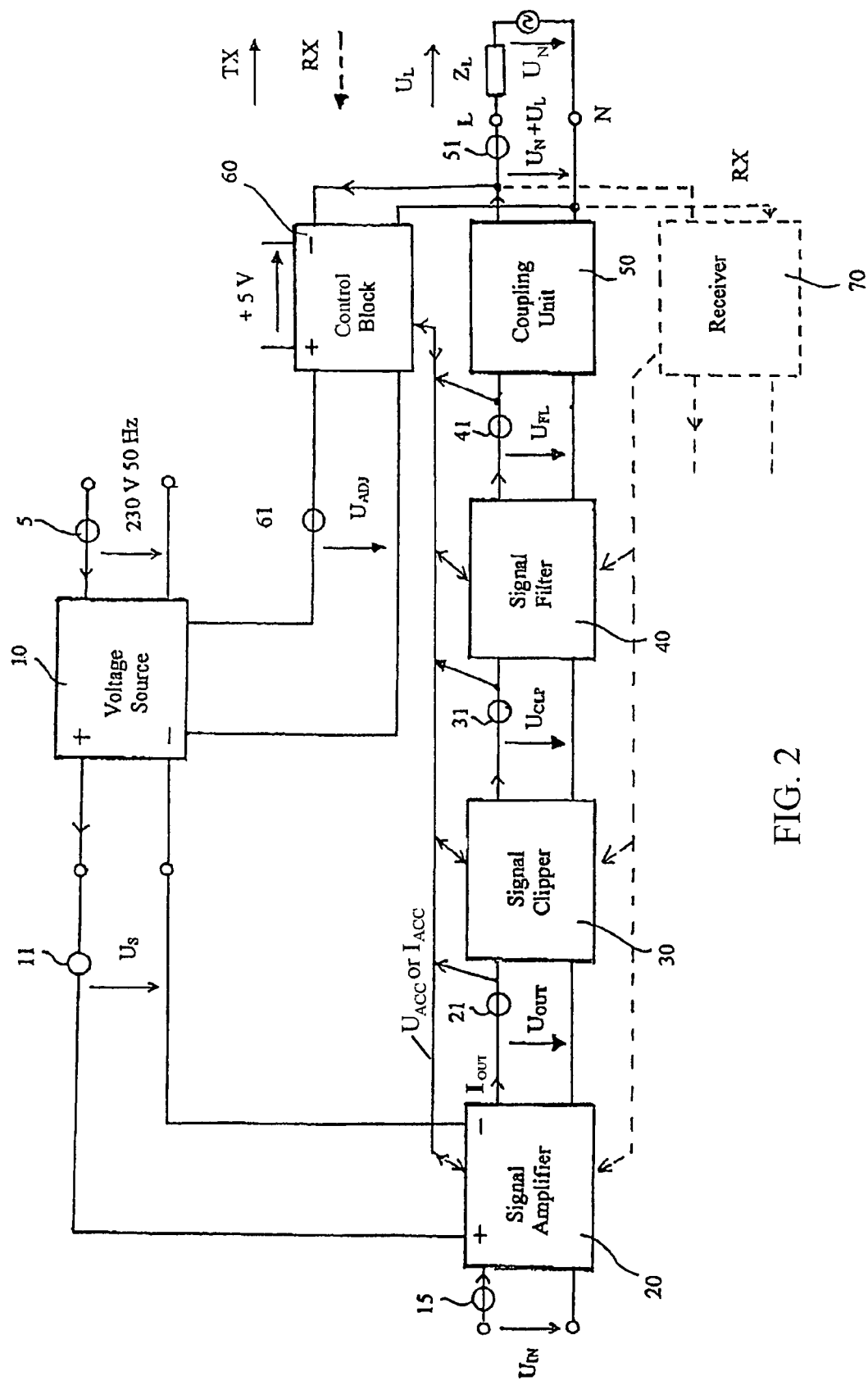
FIG. 2. is a block diagram of an exemplary embodiment of the invention.

FIG. 4 shows the load signal voltage $U_L$ achievable by means of this practical application as function of network impedance $Z_L$. $U_{L1}$ is the load signal level according to the invention. $U_{L2}$=is the load signal level according to the traditional solution.

By means of supply voltage $U_S$=+15 V as level $U_L$ and as function of net impedance $Z_L$ of signal amplifier 20, without signal clipping (zener diodes $D_1$ and $D_2$ excluded) and with signal clipping (zener diodes($D_1$ and $D_2$ included) following values are measured:

TABLE 1

Load signal $U_L$ as function of net impedance $Z_L$ without and with signal clipping

| $U_L$(Vpp)/$Z_L$ (ohm) | | $U_L$(Vpp)/$Z_L$ (ohm) | |
|---|---|---|---|
| $D_1$ and $D_2$ are not | 6.0/50 | $D_1$ and $D_2$ is are | 4.1/50 |
|  | 4.8/5 | Invention | 3.5/5 |
|  | 4.4/2 |  | 3.2/2 |
|  | 3.1/1 |  | 2.7/1 |

If the supply voltage $U_S$ is increased, then also by very low values (e.g. 1 ohm) of net impedance $Z_L$ a higher load signal $U_L$ than presented in table 1 and in FIG. 1 is achieved. In practice the significance of this is yet so small that it hardly pays to use an operating voltage higher than $U_S$=+15 V.

Also using signal clipper components more effective and better than the zener diodes it is easier to keep the $U_L$ constant.

The invention claimed is:

1. A method for controlling the load signal of a signal transmitter in a data system sending data in low voltage network in order to maintain the load signal voltage constant, wherein said output signal is coupled to the network by a coupling unit that provides signal coupling to the network, and the method further uses a signal amplifier for producing an output signal and an output current, a signal filter and an voltage source for producing a signal amplifier supply voltage, the method comprising:

clipping the output signal of the signal amplifier, said clipping being dependent on the load voltage of the signal to be sent to the network or dependent on the output current from the signal amplifier.

2. A method according to claim 1 further comprising delivering to the signal amplifier a supply voltage inversely proportional to the load signal of the voltage source.

3. A method according to claim 1 further comprising delivering a signal inversely proportional to the supply voltage of the voltage source under the control of a control unit.

4. A method according to claim 1 wherein, on transmission, a signal to be sent is clipped, using a signal clipper, by clipping an input signal and/or an output signal of the signal amplifier, the output signal of signal clipper and/or of other units being dependent on the load signal voltage or the load signal current in order to maintain the load signal voltage independent of the network impedance.

5. A method according to claim 1 further comprising adjusting the supply voltage of the signal amplifier using an adjustable voltage source, the source voltage of the adjustable voltage source being adjusted using a control unit such that the output voltage of the signal amplifier is also adjusted by said clipping so that the load signal voltage remains constant and independent of the network impedance.

6. A method according to claim 1 further comprising adjusting the signal voltage associated with said signal amplifier and said signal filter is using a direct voltage or another adjusting variable proportional to the load signal that is derivable from a system receiver.

7. A method for controlling the load signal of a signal transmitter in a data system sending data in low voltage network in order to maintain the load signal voltage constant, wherein said output signal is coupled to the network by a coupling unit that provides signal coupling to the network, and the method further uses a signal amplifier for producing an output signal and an output current, a signal filter and a voltage source for producing a signal amplifier supply voltage, the method comprising:

clipping an input signal to said signal amplifier, said clipping being dependent on the load voltage of the signal to be sent to the network or dependent on the output current from the signal amplifier.

8. A method according to claim 7 further comprising delivering to the signal amplifier a supply voltage inversely proportional to the output signal of the operating source.

9. A method according to claim 7 further comprising delivering a signal inversely proportional to the source voltage of the voltage source under the control of a control unit.

10. A method according to claim 7 wherein, on transmission, the signal to be sent is clipped, using a signal clipper, by clipping an input signal and/or an output signal of the signal amplifier, the output signal of signal clipper and/or of other units being dependent on the load signal voltage or the load signal current in order to maintain the load signal voltage independent of the network impedance.

11. A method according to claim 7 further comprising adjusting the supply voltage of the signal amplifier using an adjustable voltage source, the output voltage of the adjustable voltage source being adjusted using a control unit such that the output voltage of the signal amplifier is also adjusted by said clipping so that the load signal voltage remains constant and independent of the network impedance.

12. A method according to claim 7 further comprising adjusting the signal voltage associated with said signal amplifier and said signal filter is using a direct voltage, or another adjusting variable proportional to the load signal, that is derivable from a system receiver.

* * * * *